(12) United States Patent
Huang et al.

(10) Patent No.: US 6,728,190 B2
(45) Date of Patent: Apr. 27, 2004

(54) DISC RECEIVER DEVICE

(75) Inventors: Chen-Yuan Huang, Taipei (TW); Chi-Shen Chang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 334 days.

(21) Appl. No.: 09/863,369

(22) Filed: May 24, 2001

(65) Prior Publication Data

US 2002/0114253 A1 Aug. 22, 2002

(30) Foreign Application Priority Data

Feb. 16, 2001 (TW) ........................................ 90103503 A

(51) Int. Cl.[7] ............................................. G11B 33/02
(52) U.S. Cl. ..................................................... 369/75.2
(58) Field of Search .............................. 369/75.2, 75.1, 369/77.2, 77.1, 247, 263

(56) References Cited

U.S. PATENT DOCUMENTS

| | | | | |
|---|---|---|---|---|
| 5,204,850 A | * | 4/1993 | Obata ......................... | 369/75.2 |
| 5,995,468 A | | 11/1999 | Furukawa ................... | 369/77.1 |
| 6,061,320 A | * | 5/2000 | Tsai ........................... | 369/75.2 |
| 6,275,459 B1 | * | 8/2001 | Obata et al. ................ | 369/75.2 |
| 6,335,914 B2 | * | 1/2002 | Tanaka et al. .............. | 369/77.1 |
| 6,490,238 B1 | * | 12/2002 | Begley et al. .............. | 369/75.2 |
| 6,498,774 B2 | * | 12/2002 | Kang et al. ................. | 369/75.2 |

* cited by examiner

*Primary Examiner*—A. J. Heinz
*Assistant Examiner*—Angel Castro
(74) *Attorney, Agent, or Firm*—Birch, Stewart, Kolasch & Birch, LLP

(57) ABSTRACT

A disc receiver device comprises a loader that can rotate through a motor and transmits power. The loader comprises a plurality of gears meshing with each other and includes a sun gear and a planet gear. The planet gear has two degrees freedom of motion of a self-rotation and a revolution that takes the sun gear as a center. The tray is driven to move by means of the self-rotation of the planet gear, enabling the tray has a retracting position projecting out of the disc driver and a loading position moving into the disc driver. And a set of sliding plates that are engaged with shafts of a mecha are driven to move by means of the revolution of the planet gear, enabling the sliding plate has a first position corresponding to the retracting position and a second position corresponding to reading position to control the inward and outward movement of the disc and the upward and downward movement of the mecha.

13 Claims, 9 Drawing Sheets

DISC RECEIVER DEVICE

TECHNICAL FIELD

The present invention relates to a disc receiver device, more particularly to a device utilized on a disc driver with a retractable disc tray in order to control inward and outward movement of the disc tray and upward and downward movement of the disc driver module.

BACKGROUND OF THE PRESENT INVENTION

In presently known disc drivers, the inward and outward movement of the disc tray and upward and downward movement of the mechanism in most disc loaders are accomplished by an individual motion mechanism, the switching clutch mode is attained through the design of teeth lacking mechanism, enabling the transmission power to be switched between two motion mechanism. However, parts needed in the transmission mechanism of such a design are rather complicated, and worse, not only will it probably yield a dynamic interference or a phase difference between a gear and rack, but it also becomes more difficult in manufacturing and design.

In U.S. Pat. No. 5,995,468, a disc driver device is revealed with a design of a cam and gear device, so as to let both the upward and downward movement of the mechanism and the inward and outward movement of the tray be accomplished at one time, and a teeth lacking phenomena does not occur and the transmission function of the entire disc driver is achieved. However, the gear and cam device displayed in this patent will drive the cam device so as to move the mechanism and tray as the gear device rotates.

The above-mentioned patent suggests that a swinging arm is mounted in the gear device, to drive the planetary swinging arm to move to and from between a first position and second position, and then, to drive the cam device to move in a straight line by the motion of the swinging arm. However, the motion cycle of the swinging arm and the interference must be considered in the narrow space of the disc driver.

SUMMARY OF THE PRESENT INVENTION

The object of this invention is to provide a disc receiver device. The present invention uses a planet-related gear set design, so as to let the inward and outward movement and upward and downward movement be done continuously. The disc receiver device revealed according to the present invention, comprises:

A base, a mechanism mounted therein, utilized to read the data of a disc, and a motor, which provides a rotating power, mounted at one end of the base;

A disc tray, which is mounted in said base in a mobile style, has a mounting face, which is hollow in a central part thereof, utilized to receive the disc, the tray having a retracting position projecting out of the base and a loading position moving into the base;

A sliding plate, which is mounted in said base in a mobile style, the sliding plate has a first position corresponding to the retracting position of said tray and a second position corresponding to the loading position of said tray;

A loader, comprising a plurality of gears that mesh each other, is mounted on the base and meshing with the motor, utilized to drive the tray to move between the first position and second position, and the tray drives the sliding plate to move from the first position to the second position.

DETAILED DESCRIPTION OF THE PREFERRED EMBODIMENTS OF THE PRESENT INVENTION

Figure 1:
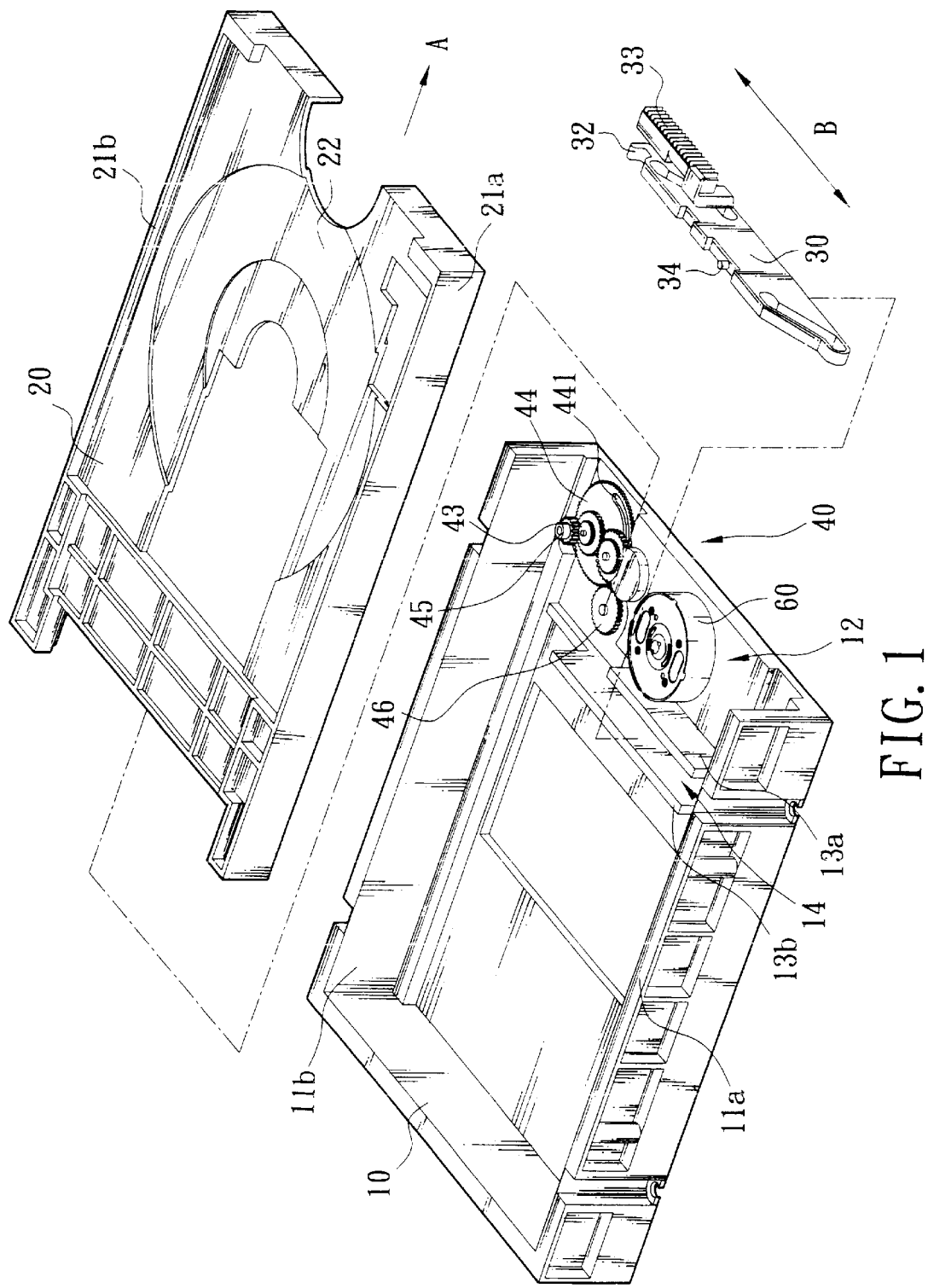
FIG. 1 is an exploded view of one preferred embodiment of the present invention.
Figure 2:
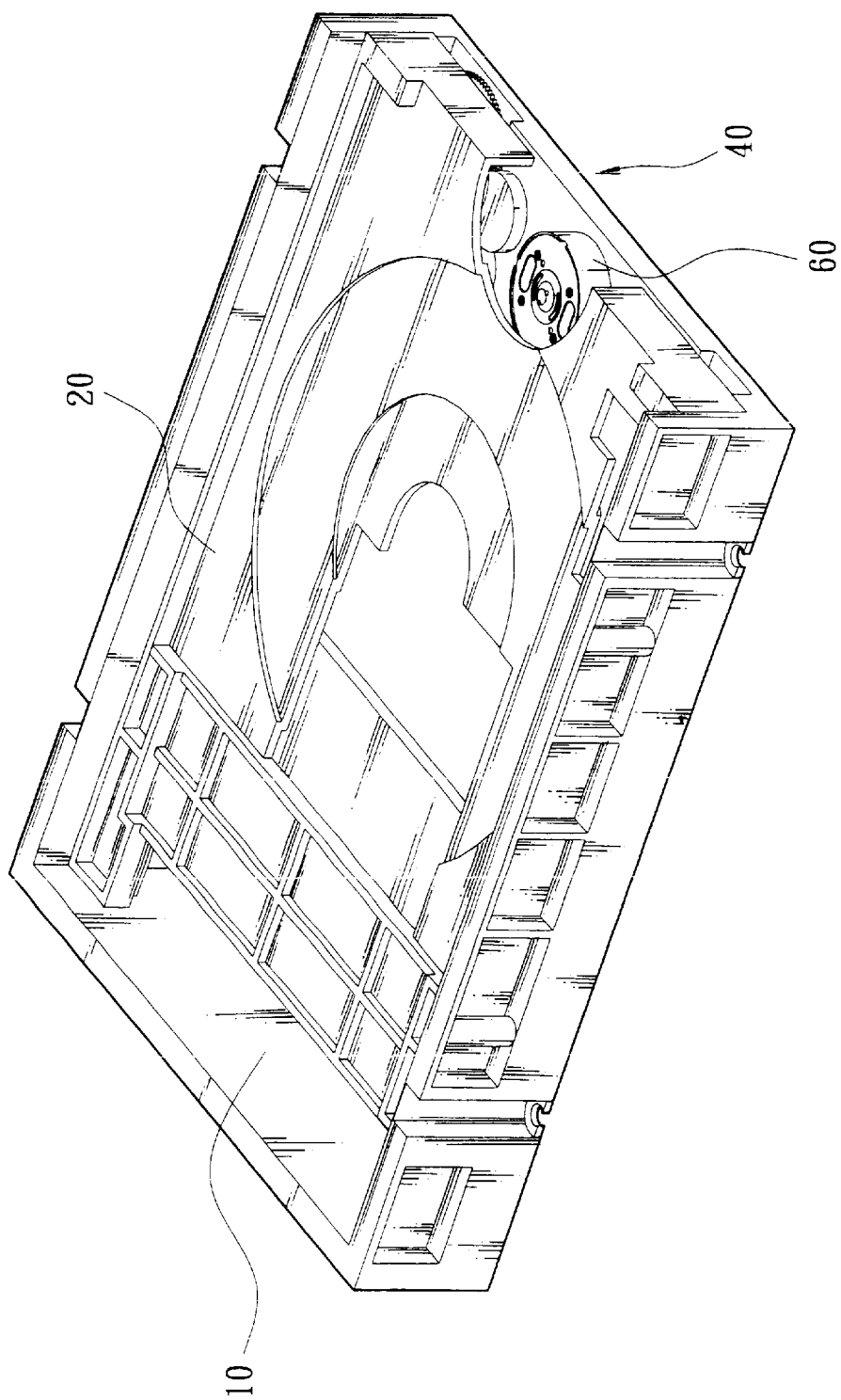
FIG. 2 is a perspective view of one preferred embodiment of the present invention.

FIGS. 1 and 2 display a disc receiver device of a disc driver with a push-pull type tray. A disc (not shown in the figures) is mounted on the disc receiver device, and is ejected out of and inserted into the disc driver through the movement of the disc receiver device. When the disc tray is moved back into the disc driver, a mechanism is moved to a horizontal position to read data; the present invention relates a design of the movement of the tray and mechanism.

Figure 7A:
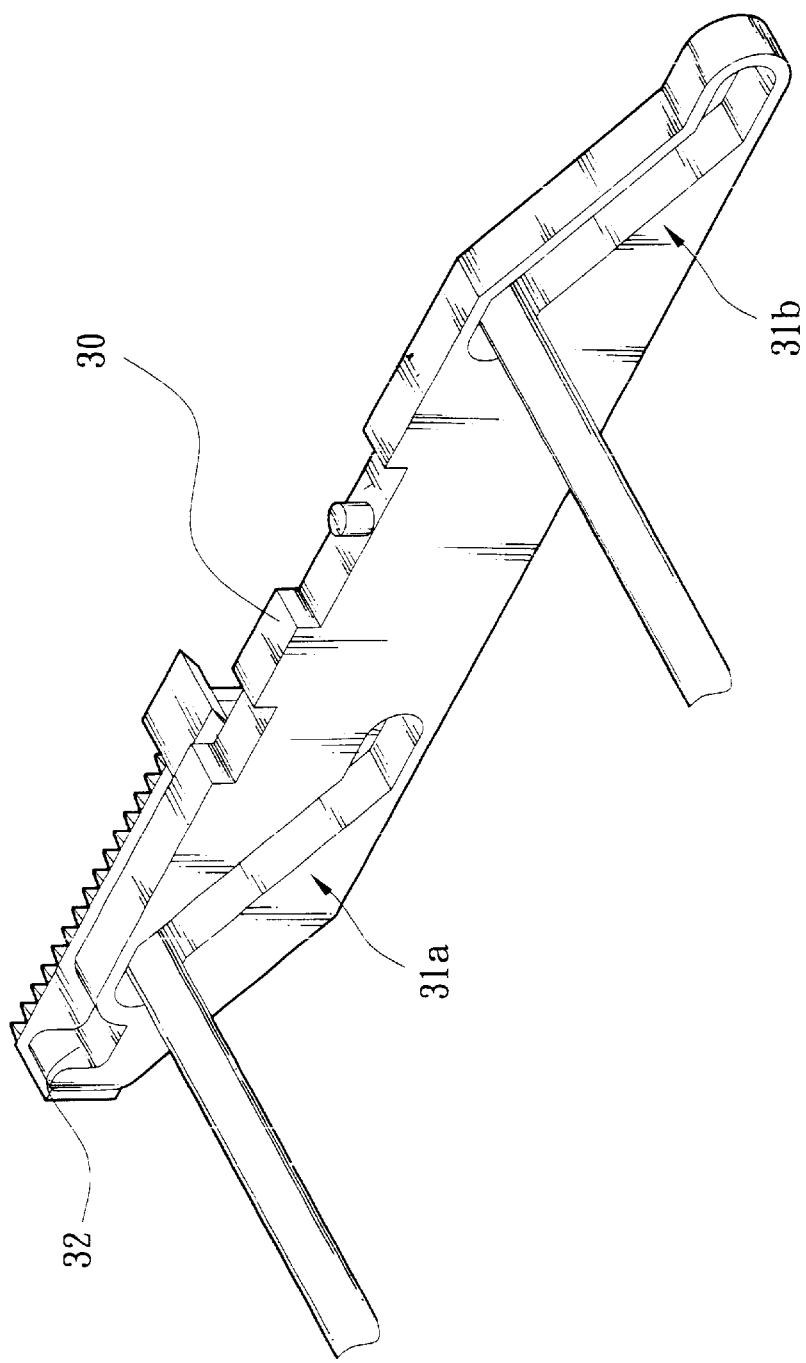
FIG. 7A is a perspective view of a sliding plate.
Figure 7B:
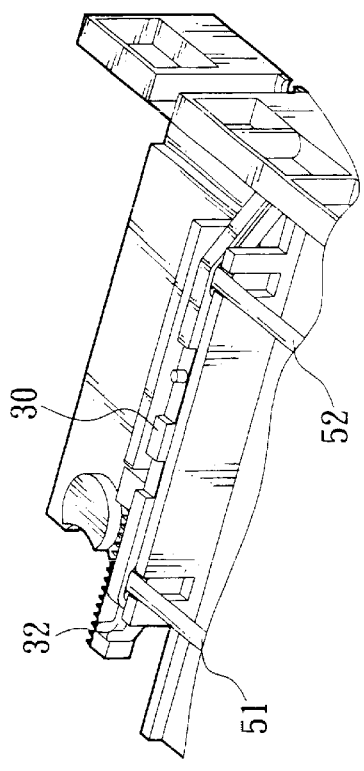
FIG. 7B is a diagram of the present invention, showing both a sliding plate and a planet gear are at a first position.
Figure 7C:
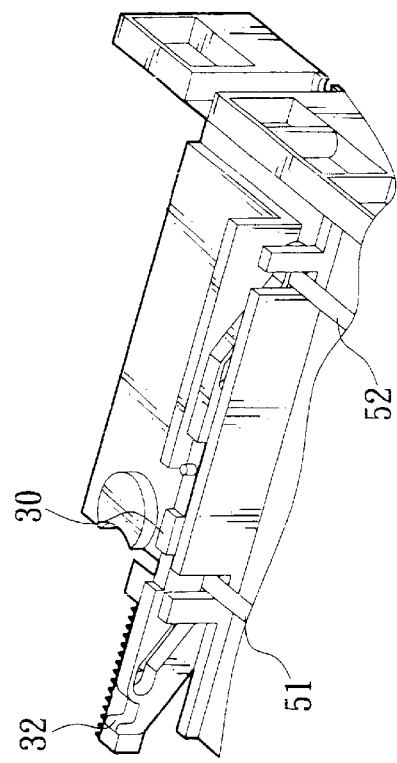
FIG. 7C is a diagram of the present invention, showing both a sliding plate and a planet gear are at a second position.

The disc receiver device of the present invention mainly comprises a base 10, a disc tray 20, a sliding plate 30 and a loader 40. The disc tray 20, which can mount a disc thereon, is movably mounted on the base 10. The tray 20 can move to and fro between a retracting position projecting outside the base 10 and a loading position in the base 10. The slide plate 30 is also movably mounted on the base 10 and is perpendicular to the moving direction of the disc tray 20. The slide plate 30 can move to and from between a first position and second position. A mechanism (not shown in the figures) is mounted at the central position of the base 10. Shafts 51 and 52 at one end of the mechanism are engaged in the slide plate 30, as shown in FIGS. 7B and 7C. Consequently, as the slide plate 30 is moved to the first position or second position, the mechanism is moved up and down synchronously between a horizontal position that is kept horizontal and an inclining position that is tilted at an angle. Here, the tray 20 and the sliding plate 30 are moved by means of the loader 40.

The base 10, which is basically a hollow casing element, at least comprises a left late 11a and right plate 11b positioned at the two sides of the moving direction of the tray 20 (an arrowhead A shown in the figure). An aperture 12 is formed at one end of the base 10 so as to let the tray 20 enter and leave the base 10 via the aperture 12. The mechanism (not shown in the drawing) is mounted on the base 10. A front block plate 13a and rear block plate 13b perpendicular to the left and right plate 11a and 11b are disposed close to the aperture 12 on the base 10 so as to form a sliding space 14 between the front block plate 13a and rear block plate 13b. Furthermore, a motor 60 is mounted between the front block plate 13a and aperture 13b so as to provide a rotating power of the loader 40 mounted between the front block plate 13a and the aperture 12.

Figure 3:
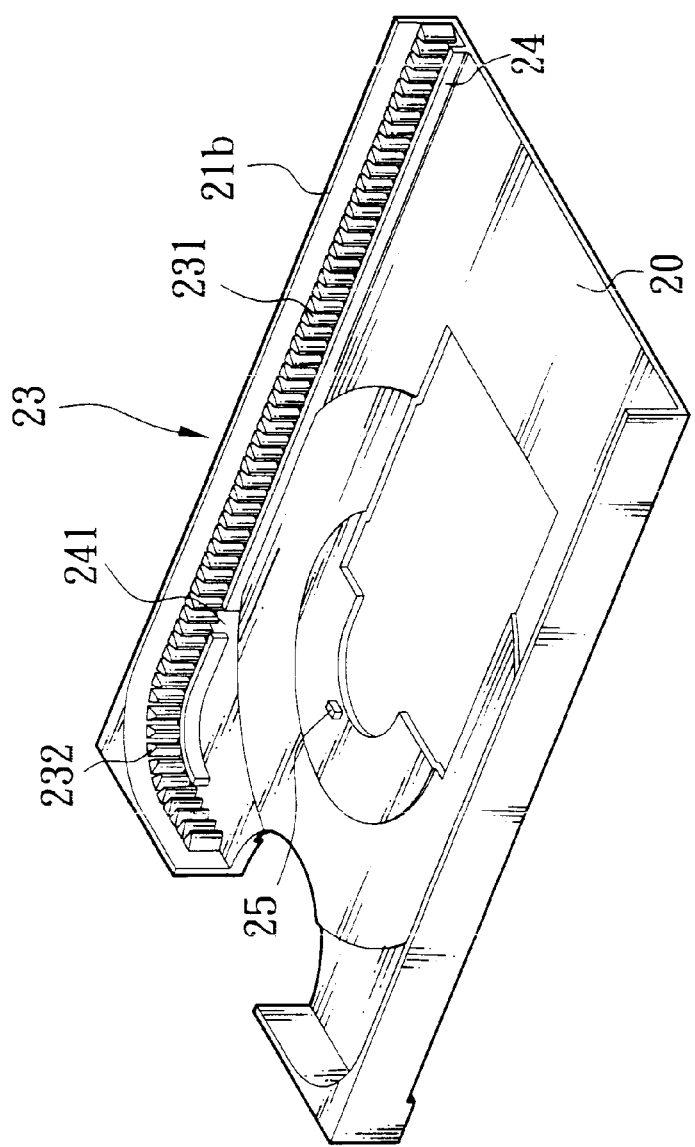
FIG. 3 is a perspective view of a bottom of a tray of the present invention.

The tray 20, whose two sides are a left wall 21a and right wall 21b, basically is a rectangular plate conforming to the base 10. Here, define a position of the tray 20 facing the moving direction (shown as A in the drawing) as a front end. The central part of the tray 20 has a hollow disc-supporting portion to be utilized to mount a disc. The tray can be received between the left plate 11a and right plate 11b of the base 10, and moves to and from along the moving direction. The tray can be moved to project out to the extracting position outside the base 10 in order to let a disc to be mounted thereon, or to be taken away from it. The tray can be moved to be received at the loading position in the base 10 to let the data of the disc to be read by means of mechanism 50. As shown in FIG. 3, a bottom face of the tray 20 is shown in the figure, a rack is disposed along the right wall 21 b at the bottom of the right wall 21b of the tray 20. The rack comprises a straight part 231 along the right wall 21b, and an arc part 232 extended curvedly from the straight part 231 toward the front end of the tray 20. A track 24 corresponding to the rack 23 is disposed at a position adjacent to the rack 23, the track 24 and the rack 23 are parallel and separated by a distance. The rack 24 has a gap 241 at a position corresponding to the joint of the straight part 231 and arc part 232. Furthermore, a block piece 25 is disposed at a proper position adjacent to the front end of the bottom face of the tray 20.

The sliding plate 30, basically is a rectangular plate conforming to a sliding space 14 of the base 10. The sliding plate can be received in the sliding space 14, and can move right and left (shown as direction B in the drawing) in the sliding space 14 with directions A and B being perpendicular. The sliding plate can move to a first position corresponding to the extracting position of the tray 20 and a second position corresponding to the loading position of the tray 20. Two corresponding slant guiding grooves 31a and 31b are disposed on the sliding plate 30, as shown in FIG. 7A, with the slant guiding groove 31a and 31b having a higher high position and a lower low position. The shafts 51 and 52 at one end of the mechanism are engaged respectively in the slant guiding grooves 31a and 31b. As the sliding plate 30 is moved to the first position or second position, the shafts 51 and 52 are carried to the high position and low position, and then, the mechanism is moved up or down to the horizontal position or sliding position, as shown in FIGS. 7B–7C. One end of the sliding plate 30 corresponds to the rack 23 has a clip 32. The clip can hook the track 24 of the tray 20 at the first position so that the sliding plate 30 can be kept at the first position and cannot be moved. A rack 33 is exposed at a face of the sliding plate 30 corresponding to the front wall 13a and meshes with the rack 33 via loader 40 to let the sliding plate 30 move to and from between the first position and second position. Furthermore, a block stick 34 is disposed at the proper position of the central part of the top face of the sliding plate 30. As the sliding plate 30 is at the first position, the block stick 34 exactly corresponds to the block piece 25 at the bottom face of the tray 20.

Figure 4:
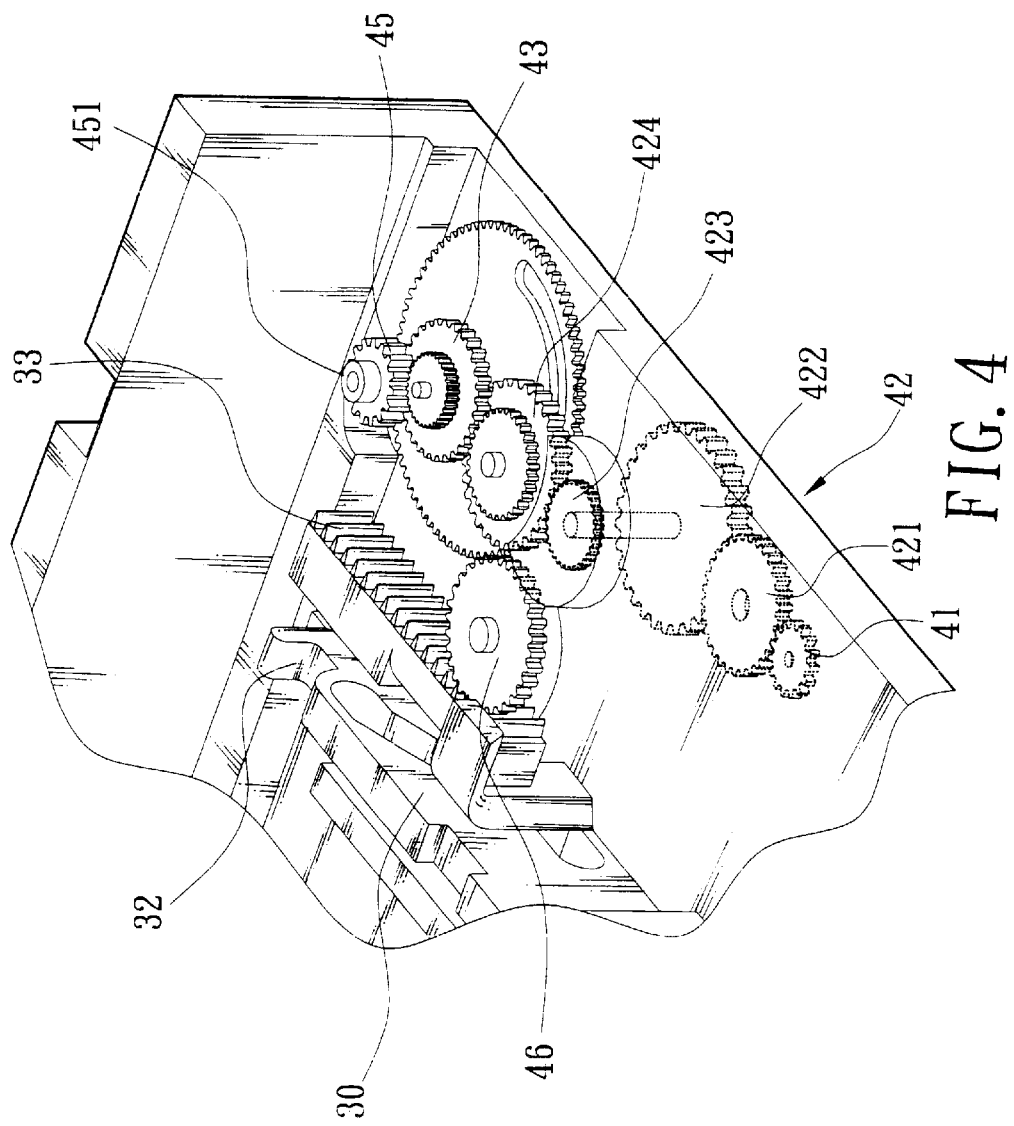
FIG. 4 is a partly perspective view of a loader of the present invention, showing an arrangement of a transmission gear set.

The loader 40 is mounted between the front wall 13a and the aperture 12. The loader is constructed from a plurality of gears and provides a rotating force by means of the motor 60. It comprises an input gear 41, a transmission gear set 42, a sun gear, a reciprocating gear 44, a planet gear 45 and a steering gear 46, as shown in FIG. 4. The input gear 41is mounted at the bottom face of the base 10 and is fixed on the shaft of the motor 60 so as to be driven by the motor 60 to rotate. The transmission gear set comprises a first transmission gear 421, a second transmission gear 422, a third transmission gear 423 and a fourth transmission gear 424. The first transmission gear 421 is mounted at the bottom face of the base and meshes with the input gear 41. The second transmission gear 422 is mounted at the bottom face of the base 10 and meshes with the first transmission gear 421 (a small gear coaxially rotating with the first transmission gear 421 is mounted below it to mesh with the second transmission gear 422, which is not shown in the drawing). The third transmission gear 423 uses a shaft, which is the same shaft fixed on the second transmission gear 422, to pass through the base 10 to be mounted over it, and rotates with the second transmission gear 422 coaxially. The fourth transmission gear 424 is engaged to a shaft (unable to be shown in the drawing) fixed on the base 10 and meshes with the third transmission gear 423.

Figure 5:
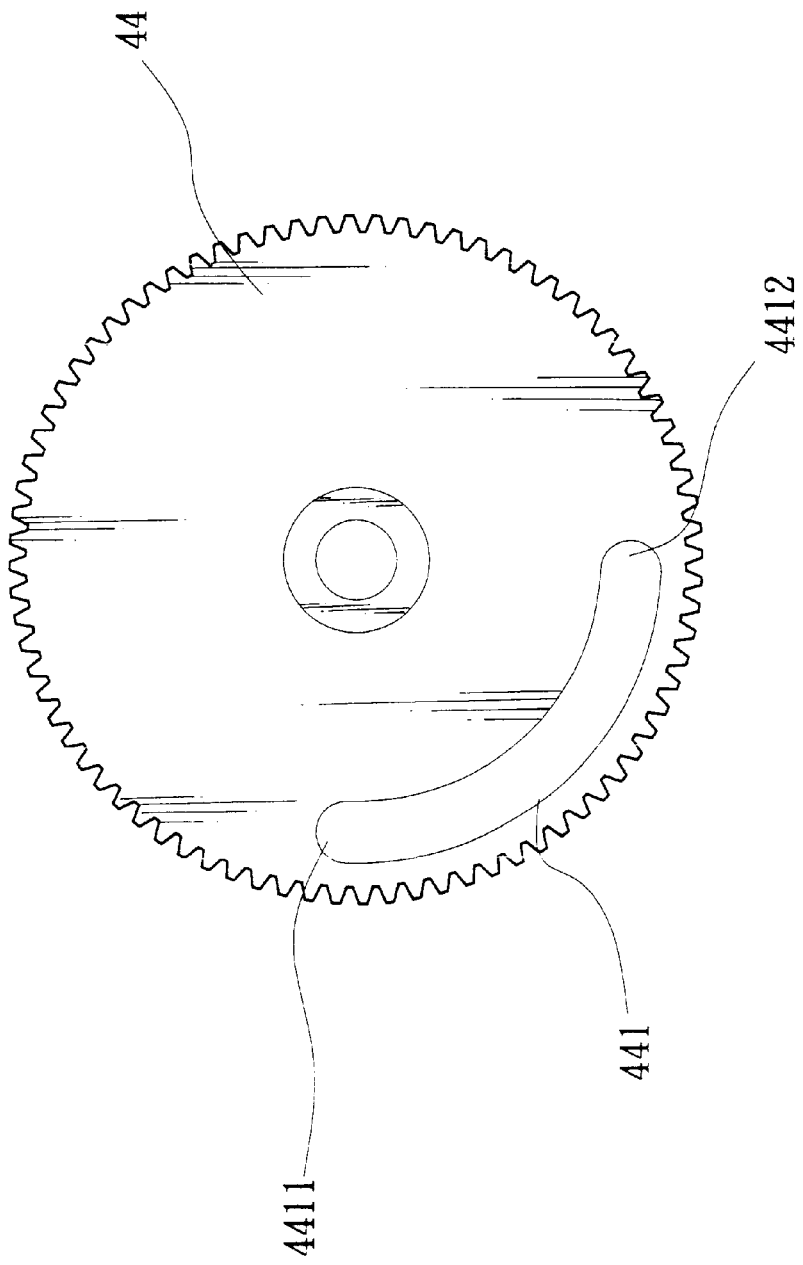
FIG. 5 is a diagram of the present invention, showing a structure of a reciprocating gear.

The sun gear 43 is engaged to a shaft fixed on the base 10 (unable to be shown in the drawing) and meshes with the fourth transmission gear 424. The axis of the sun gear 43 and the center of the arc 232 of the rack 23 must be at the same point. The reciprocating gear 44 is engaged below the sun gear 43 and has a same axis as the sun gear 43, but when the sun gear 43 is driven to rotate, the reciprocating gear doesn't rotate as the sun gear does. An arcuate guiding groove 441 is disposed on the circumferential face of the reciprocating gear 44, as shown in FIG. 5. Among them, the shaft of the fourth transmission gear 424 passes through the arcuate guiding groove 441 of the reciprocating gear 44. The arcuate guiding groove 441 has a first terminal 4411 and second terminal 4412 corresponding to the first position and second position of the sliding plate 30. Therefore, the reciprocating gear 44 is limited by the shaft of the fourth transmission gear 424 and can only rotate left and right reciprocally between the first terminal 4411 and the second terminal 4412 of the arcuate guiding groove.

The planet gear is engaged in a shaft (not shown in the drawing) fixed at the circumferential face of the reciprocating gear 44 and meshes with the sun gear and rack 23. The sun gear 43 drives planet gear 45 to rotate to let the planet gear 45 have a motion freedom of self-rotation, and then, to drive the tray to move between the extracting position and loading position, when the planet gear 45 enters from the straight part 231 into arc part 232 of the rack 23, the axle center of the sun gear 43 and the center of the arc 232 will be at the same position so as to let the planet gear take the axle center of the sun gear as a center to rotate along the arc 232. It also means that the planet gear 45 has a motion freedom of revolution around the sun gear 43, and when the planet gear takes a revolution, it will drive the reciprocating gear 44 to rotate. A sliding wheel 451, which can rotate freely, is further disposed at the same axis as the planet gear. The sliding gear can lean against the outer wall face of the track 24 of the tray 20 so that it is rather smoother when the planet gear 45 drives the tray 20 to move.

The steering gear 46 meshes with the reciprocating gear 44 and the rack 33 respectively so as to transmit the motion of the reciprocating gear 44 to the rack 33 to drive the sliding plate to move to an from between the first position and the second position.

Figure 6A:
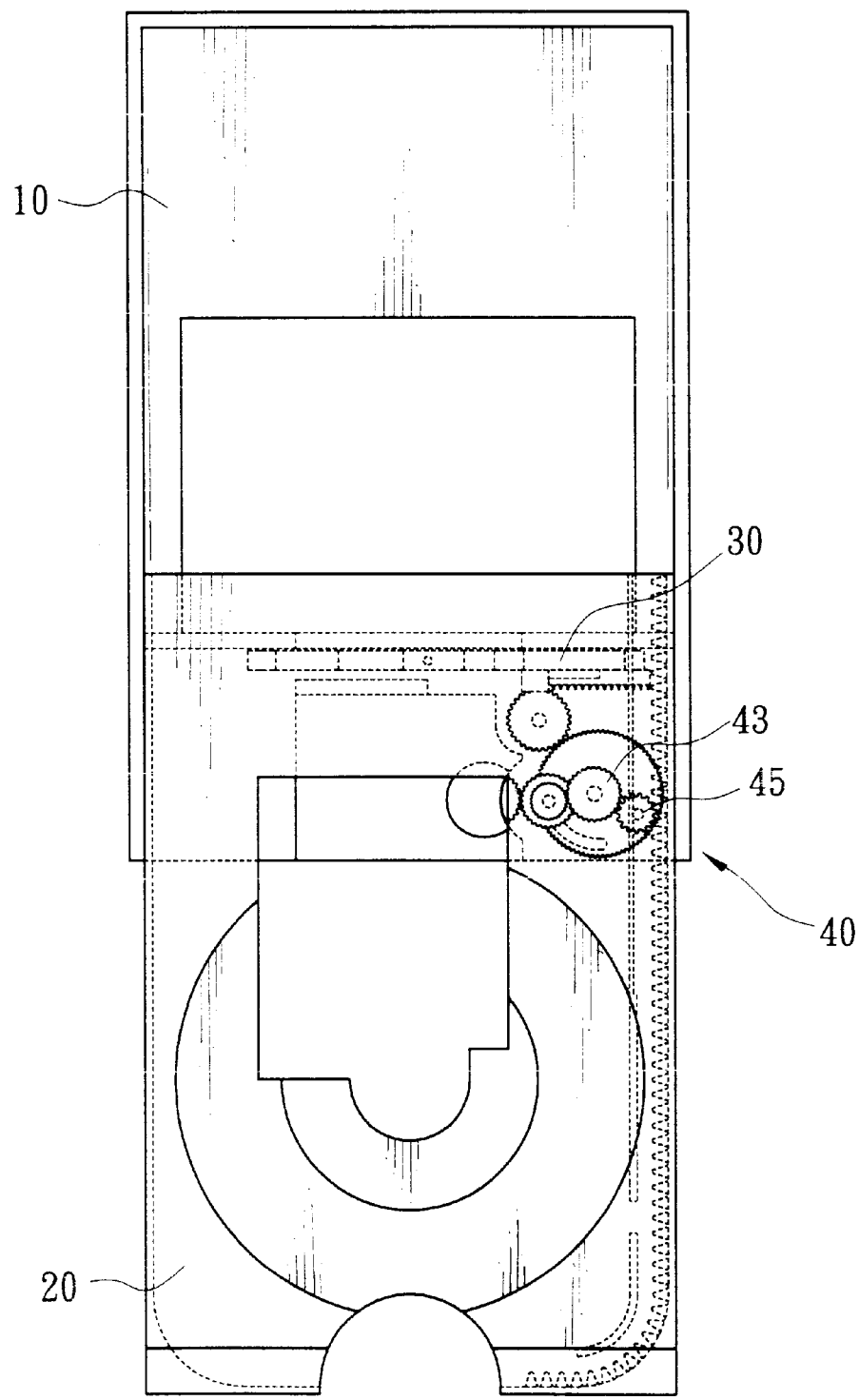
FIG. 6A is a diagram of the present invention, showing that a tray is at a retracting position.
Figure 6B:
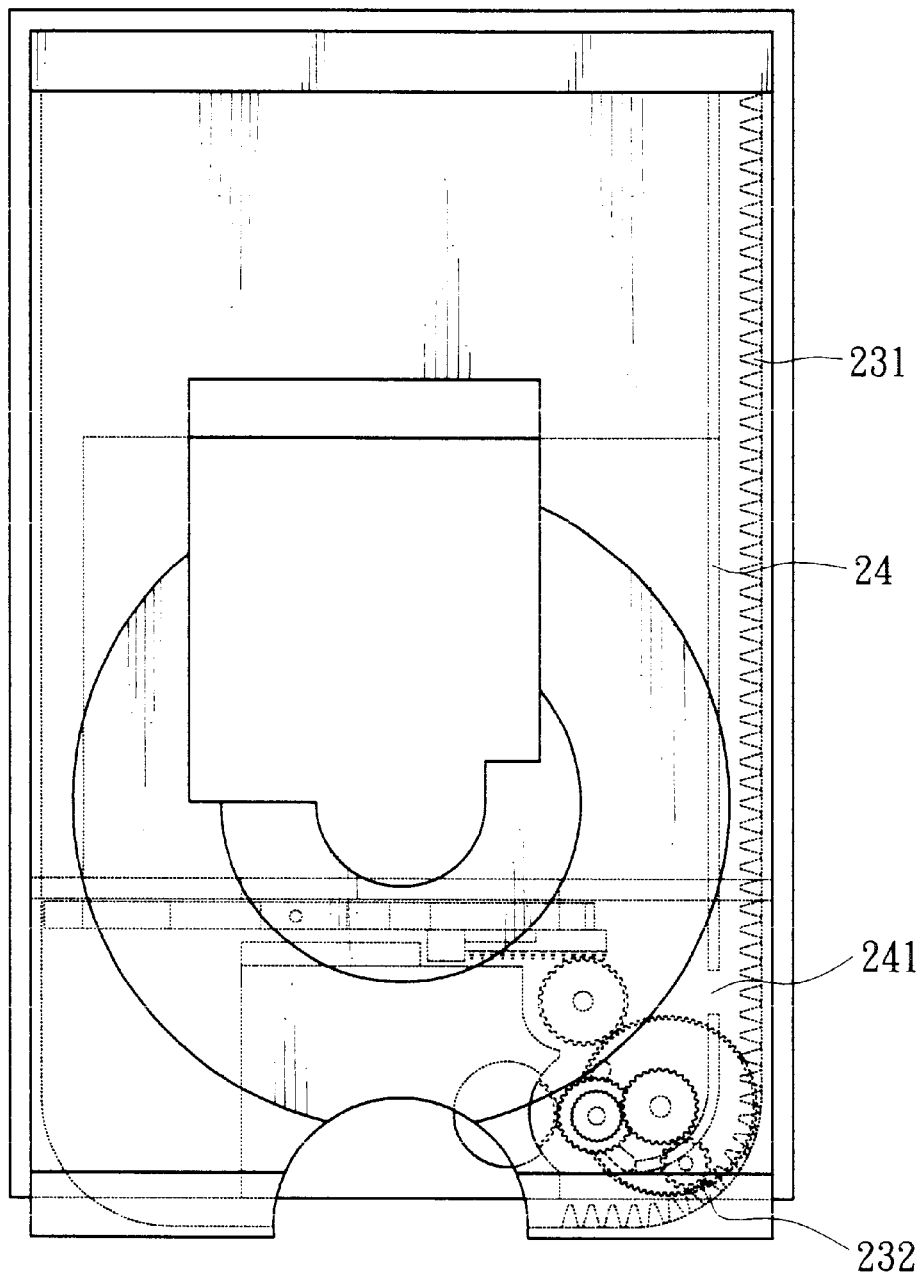
FIG. 6B is a diagram of the present invention, showing that a tray is at a loading position.

As FIGS. 6A and 6B show, the diagram shown in the figure is to display the motion relationship between the tray 20, sliding plate 30 and the loader 40. FIG. 6A shows that the tray 20 is projecting out to the retracting position of the base 10, and at the retracting position, a user can place a disc on the mounting face 22 of the tray 20, or take away a disc from the mounting face 22 of the tray 20. When the tray is at its retracting position, the planet gear 45 is located at the rearmost end of the straight part 231 of the rack 23, and the second terminal 4412 of the arcuate guiding groove 441 on the reciprocating gear 44 will lean against the shaft of the fourth transmission gear 424. Besides, the sliding plate 30 is at the first position corresponding to the retracting position, and the clip 32 of the sliding plate 30 hooks on the inner wall face of the track 24, the shaft 51 and 52 of the mechanism 50 is positioned at the lower position of the slant guiding groove 31a and 31b, as shown in FIG. 7A, enabling the mechanism 50 to be kept at an inclined position inclining a certain degree of angle.

How the present invention is utilized to received the tray 20 into the base 10 and to read the data from disc will be shown as follows: after the motor 60 is driven, the rotation power of the motor 60 is transmitted to the transmission gear set 42 and sun gear 43, then to the planet gear 45 to let the planet gear 45 start self-rotation. The planet gear 45 meshes with the rack 23 to drive the tray 20 to move forward to the loading position, at that time, the sliding wheel leans against the outer wall face of the track 24 by the way that the clip 32 of the sliding plate hooks on the inner wall face of the track 24, enabling the tray 20 to move smoothly and stably. The sliding plate 30 is not allowed to move when the tray 20 is moving by the way that the clip 32 hooks on the inner wall face of the track 24, until the planet gear 45 is moved to the joint of the straight line 231 and arc 232 of the rack 23. At this position, the clip 32 of the sliding plate 30 corresponds to the slit 241 of the track 24, and the block stick 34 corresponds to the block piece 25 of the tray 20. When the planet gear 45 enters the arc part 232, the planet gear 45 not only self rotates, but also rotates along the arc part 232, this is to say, the planet gear 45 takes the sun gear 43 as a center to take a revolution. This will drive the reciprocating gear 44 to rotate, and the steering gear 46 will transmit the rotating power to the rack 33 to drive the sliding plate 30 to start to move, the clip 32 of the sliding plate 30 is moved out from the slit 241 of the track 24, the block stick 34 of the sliding 30 and the block piece 25 of the tray 20 interlock, moreover, to let the sliding plate 30 move from the first position to the second position. When the planet gear reaches the ultimate end of the arc 232, the tray will reach the loading position and is received in the base 10. In the meantime, the sliding plate also reaches the second position, to move the shaft 51 and 52 of the mechanism 50 to the highest positions of the slant guiding groove 31a and 31b, as shown in FIG. 7B, enabling the mechanism 50 to move to a horizontal position, to read the data from the disc. On the contrary, when the disc is prepared to take away from the tray, the motor 50 starts to reverse to drive the planet gear to take a self-rotation and revolution to let the sliding plate move from the second position to the first position, thereby, the tray will move from the loading position forward to the retracting position. When the planet gear 45 is moved to the ultimate end of the straight line 231, the tray 20 is also moved to the retracting position, and the user can take away the disc from the tray.

It is to be understood that the drawing is designed for purpose of illustration only, and is not intended for use as a definition of the limits and scope of the invention disclosed.

What is claimed is:

1. A disc receiver device, comprising:
    a base having a mechanism utilized to read data of a disc, and a motor mounted at one end of said base for providing a rotating power;
    a tray movably mounted in said base including a mounting face with hollow at a central part thereof for receiving said disc, said tray having a retracting position projecting out of said base and a loading position moving into said base;
    a sliding plate movably mounted in said base, the moving direction of said sliding plate being perpendicular to the moving of said tray, wherein said sliding plate has a first position corresponding to said retracting position of said tray and a second position corresponding to said loading position of said tray, said sliding plate drives said mechanism to move to an inclined position at said first position and said sliding plate drives said mechanism to a horizontal position at said second position; and
    a loader comprising a plurality of gears that meshing each other, said loader mounted on said base and meshed with said motor for driving said tray to move between said first position and said second position and said sliding plate to move between said retracting position and said loading position, wherein when said tray is close to said loading position, said tray drives said sliding plate to move from said first position to said second position;
    wherein said tray further comprising a tray rack disposed at one side of the bottom of said tray and meshed with said loader, wherein said tray rack includes a straight part and an arc part extended curvedly, from said straight line part to the front end of said tray; and
    wherein said tray having a track parallel to said tray rack at a position close to said tray rack of the bottom of said tray, said track disposes a slit corresponding to the joint of said straight part and said arc part.

2. The device of claim 1, wherein said base further comprising a sliding space for said sliding plate to move.

3. The device of claim 1, wherein said sliding plate having two slant guiding grooves corresponding to each other, each said slant guiding groove is used for a shaft of said mechanism to be inserted in, and each said slant guiding groove has a lowermost position corresponding to said first position of said sliding plate and a highest position corresponding to said second position of said sliding plate.

4. The device of claim 1, wherein said loader comprising:
    an input gear mounted at the axis of said motor;
    a transmission gear set meshing with said input gear to transmit said rotating power;
    a sun gear meshing with said transmission gear set;
    a reciprocating gear being at the same axis with said sun gear and not rotating with said sun gear;
    a planet gear fixed at a different axis with said reciprocating gear and meshing with said sun gear and said tray rack, wherein said sun gear drives said planet gear to self-rotate and said planet gear drives said disk tray moves between said retracting position and said loading position, when said planet gear is rotated into said arc part of said tray rack, said planet gear will take a revolution around said sun gear and along said arc part, so as to move said reciprocating gear rotate to and fro between two ends of the circumference of said arc part; and
    a steering gear meshing with said reciprocating gear and said sliding plate rack and driven by said reciprocating gear said steering gear drives said sliding plate to move between said first position and said second position.

5. The device of claim 4, wherein said transmission gear set including a first transmission gear meshing with said input gear, a second and third transmission gear meshing each other, and a fourth transmission gear meshing with said third transmission and said sun gear, to provide said sun gear rotating power.

6. The device of claim 5, wherein said reciprocating gear comprising an arcuate guiding disposed on the circumferential face, said arcuate guiding groove mounts a shaft of said fourth gear to limit the moving cycle of said reciprocating gear.

7. The device of claim 4, wherein the centers of the axis of said sun gear and said arc part of said tray rack are at a same point.

8. A disc receiver device, comprising:
   a base having a mechanism utilized to read data of a disc, and a motor mounted at one end of said base for providing a rotating power;
   a tray movably mounted in said base including a mounting face with hollow at a central part thereof for receiving said disc, said tray having a retracting position projecting out of said base and a loading position moving into said base, said tray further including a tray rack disposed at one side of the bottom of said tray, said tray rack having a straight part parallel to the flank side of said tray and an arc part extending curvedly from said straight line part, a track at same level with said tray rack being disposed on the bottom of said tray, a gap being disposed at a position of said track corresponding to the joint of said straight part and said arc part;
   a sliding plate movably mounted in said base, the moving direction of said sliding plate being perpendicular to the moving of said tray, wherein said sliding plate has a first position corresponding to said retracting position of said tray and a second position corresponding to said loading position of said tray, said sliding plate drives said mechanism to move to an inclined position at said first position and said sliding plate drives said mechanism to a horizontal position at said second position; and
   a loader, comprising a plurality of gears meshing each other and meshing with said motor, utilized to drive said tray to move between said first and said second position, said plurality of said gears including:
   an input gear mounted at the axis of said motor;
   a transmission gear set meshing with said input gear to transmit said rotating power;
   a sun gear meshing with said transmission gear set;
   a reciprocating gear being at the same axis with said sun gear and not rotating with said sun gear;
   a planet gear fixed at a different axis with said reciprocating gear and meshing with said sun gear and said tray rack, wherein said sun gear drives said planet gear to self-rotate and said planet gear drives said disk tray moves between said retracting position and said loading position, when said planet gear is rotated into said arc part of said tray rack, said planet gear will take a revolution around said sun gear and along said arc part, so as to move said reciprocating gear rotate to and from between two ends of the circumference of said arc part; and
   a steering gear meshing with said reciprocating gear and said sliding plate rack and driven by said reciprocating gear, said steering gear drives said sliding plate to move between said first position and said second position.

9. The device of claim 8, wherein said base further comprising a sliding space for said sliding plate to move.

10. The device of claim 8, wherein said sliding plate having two slant guiding grooves corresponding to each other, each said slant guiding groove is used for a shaft of said mechanism to be inserted in, and each said slant guiding groove has a lowermost position corresponding to said first position of said sliding plate and a highest position corresponding to said second position of said sliding plate.

11. The device of claim 8, wherein said transmission gear set including a first transmission gear meshing with said input gear, a second and third transmission gear meshing each other, and a fourth transmission gear meshing with said third transmission and said sun gear, to provide said sun gear rotating power.

12. The device of claim 8, wherein said reciprocating gear comprising an arcuate guiding disposed on the circumferential face, said arcuate guiding groove mounts a shaft of said fourth gear to limit the moving cycle of said reciprocating gear.

13. The device of claim 8, wherein the centers of the axis of said sun gear and said arc part of said tray rack are at a same point.

* * * * *